(12) United States Patent
Choi et al.

(10) Patent No.: US 11,250,749 B2
(45) Date of Patent: Feb. 15, 2022

(54) DISPLAY DEVICE AND IMAGE PROCESSING METHOD THEREOF

(71) Applicant: LG Display Co., Ltd., Seoul (KR)

(72) Inventors: Seong-Min Choi, Goyang-si (KR); Jin-Young Oh, Paju-si (KR); Eun-Kyung Hong, Paju-si (KR); Min-Jae Yoo, Seoul (KR); Jae-Yoon Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/118,140

(22) Filed: Dec. 10, 2020

(65) Prior Publication Data

US 2021/0201723 A1 Jul. 1, 2021

(30) Foreign Application Priority Data

Dec. 30, 2019 (KR) .......................... 10-2019-0177989

(51) Int. Cl.
*G09G 3/00* (2006.01)
*G09G 5/10* (2006.01)
(52) U.S. Cl.
CPC ............... *G09G 3/035* (2020.08); *G09G 5/10* (2013.01); *G09G 2340/0442* (2013.01); *G09G 2360/144* (2013.01); *G09G 2380/02* (2013.01)

(58) Field of Classification Search
None
See application file for complete search history.

(56) References Cited

U.S. PATENT DOCUMENTS

2018/0342192 A1* 11/2018 Lee .................... G06F 1/1652

FOREIGN PATENT DOCUMENTS

KR 10-2018-0130071 A 12/2018

* cited by examiner

*Primary Examiner* — Aneeta Yodichkas
(74) *Attorney, Agent, or Firm* — Seed IP Law Group LLP

(57) ABSTRACT

The present disclosure relates to a display device capable of reducing a stress cumulative deviation and preventing image sticking with respect to a boundary between first and second display areas separately driven according to the shape and use environment of a display panel, and a display device may include: a panel displaying an image through a display area composed of a plurality of pixels and having a variable shape; a panel driver for driving the panel; and an image processor for dividing the display area into a first display area and a second display area when the shape of the panel is changed, determining a boundary neighboring region including a first boundary neighboring region and a second boundary neighboring region, and modulating data corresponding to the boundary neighboring region using a result of analysis of an image corresponding to the boundary neighboring region.

13 Claims, 13 Drawing Sheets

DISPLAY DEVICE AND IMAGE PROCESSING METHOD THEREOF

CROSS-REFERENCE TO RELATED APPLICATION

This application claims the benefit of Republic of Korean Patent Application No. 10-2019-0177989, filed on Dec. 30, 2019, which is incorporated by reference in its entirety.

BACKGROUND

Technical Field

The present disclosure relates to a display device and an image processing method thereof, which can reduce a stress cumulative deviation and prevent image sticking with respect to a boundary between first and second display areas that are separately driven according to the shape and use environment of a display panel.

Description of the Related Art

Flexible display devices that can be folded or unfolded by users are developed according to enhancement of display technology. Flexible display devices can include various display devices, shapes of which can be changed, such as foldable, bendable, rollable and stretchable display panels.

When a display panel is folded or rolled, the display panel can be divided into a first display area that is a viewing area and a second display area that is a non-viewing area and separately driven, and the second display area (non-viewing area) can be blocked from displaying images through a circuit or can display a black image in order to reduce power consumption.

When a display panel is used for a long time in a folded state or a rolled state, stress cumulative deviation due to a usage difference between the first display area in an emitting state and the second display area in a non-emitting state is generated. Accordingly, linear cognitive image sticking occurs at the boundary between the first and second display areas at which a panel shape changes due to a deterioration difference between the first and second display areas and thus the lifespan and quality of products deteriorate.

BRIEF SUMMARY

One or more embodiments of the present disclosure provides a display device and an image processing method thereof which can reduce a stress cumulative deviation and prevent image sticking at the boundary between first and second display areas that are separately driven according to the shape and utilization environment of a display panel.

A display device according to various embodiments includes: a panel displaying an image through a display area composed of a plurality of pixels and having a variable shape; a panel driver for driving the panel; and an image processor for dividing the display area into a first display area and a second display area when the shape of the panel is changed, determining a boundary neighboring region including a first boundary neighboring region adjacent to a boundary line between the first and second display areas in the first display area and a second boundary neighboring region adjacent to the boundary line in the second display area, and modulating data corresponding to the boundary neighboring region using a result of analysis of an image corresponding to the boundary neighboring region.

An image processing method of a display device according to various embodiments includes: detecting change in a shape of a panel displaying an image through a display area composed of a plurality of pixels; and dividing the display area into a first display area and a second display area when the shape of the panel is changed, determining a boundary neighboring region including a first boundary neighboring region adjacent to a boundary line between the first and second display areas in the first display area and a second boundary neighboring region adjacent to the boundary line in the second display area, and modulating data corresponding to the boundary neighboring region using a result of analysis of an image corresponding to the boundary neighboring region.

The image processor may modulate the data corresponding to the boundary neighboring region such that luminance and contrast of the boundary neighboring region decrease according to average brightness and image complexity of the region included in the image analysis result with respect to the boundary neighboring region, and external light intensity.

The image processor may control at least one of the area of the boundary neighboring region on which data modulation is performed and luminance and contrast decrement according to the external light intensity.

The image processor may apply a mask for image analysis to the image corresponding to the boundary neighboring region, determine a maximum reference value and a minimum reference value for determining the contrast by applying the average brightness of the region, the image complexity according to image edge count of the region, the external light intensity, and recognition parameters in units of the mask, and modulate image data of the boundary neighboring region using a ratio of a difference between the maximum reference value and the minimum reference value to a maximum value of image data determined by a bit number, and the minimum reference value.

The image processor may detect a folding angle of the panel through a sensor and control at least one of a pixel distance of the boundary neighboring region on which data modulation is performed, the size of the mask for image analysis, and the recognition parameters in response to a folding angle of the panel.

The pixel distance of the boundary neighboring region, the mask size, and the recognition parameters may increase as the folding angle decreases.

The image processor may detect change in the shape of the panel through a display state detector, detect the external light intensity and a viewing environment and a viewing state of a user through a viewing environment/state detector, analyze image characteristics in the boundary neighboring region according to the detected panel shape change and viewing environment and viewing state of the user, and control at least one of the area of the boundary neighboring region and the luminance contrast decrement.

The image processor may determine the first display area as a viewing area, determine the second display area as a non-viewing area on the basis of the detected panel shape and viewing state of the user, provide a corresponding image to the first display area, and provide a black image to the second display area.

The image processor may determine both the first display area and the second display area as a viewing area on the basis of the detected panel shape and viewing state of the user, provide a first image to the first display area, and provide a second image to the second display area.

The panel may be a foldable panel, and the image processor may detect a folding state and a folding angle of the foldable panel through an external sensor.

The panel may be a rollable panel, and the image processor may receive the number of rotations and rotating state information with respect to the rollable panel from a roller and divide the display area into the first display area corresponding to a viewing area and the second display area corresponding to a non-viewing area.

The display device according to various embodiments can reduce a stress cumulative deviation and delay or prevent generation of image sticking in a region adjacent to the boundary between the first and second display areas by modulating image data with respect to the region adjacent to the boundary between the first and second display areas separately driven according to the shape and use environment of the display panel in consideration of the brightness, colors, complexity and luminance of an image.

The display device according to various embodiments can reduce a stress cumulative deviation and delay or prevent generation of image sticking in a region adjacent to the boundary between the first and second display areas by controlling at least one of a data modulation processing area, a mask size and recognition parameters with respect to the region adjacent to the boundary between the first and second display areas according to a folding angle and modulating data.

DETAILED DESCRIPTION

Hereinafter, preferred embodiments of the present disclosure will be described with reference to the drawings.

Figure 1:
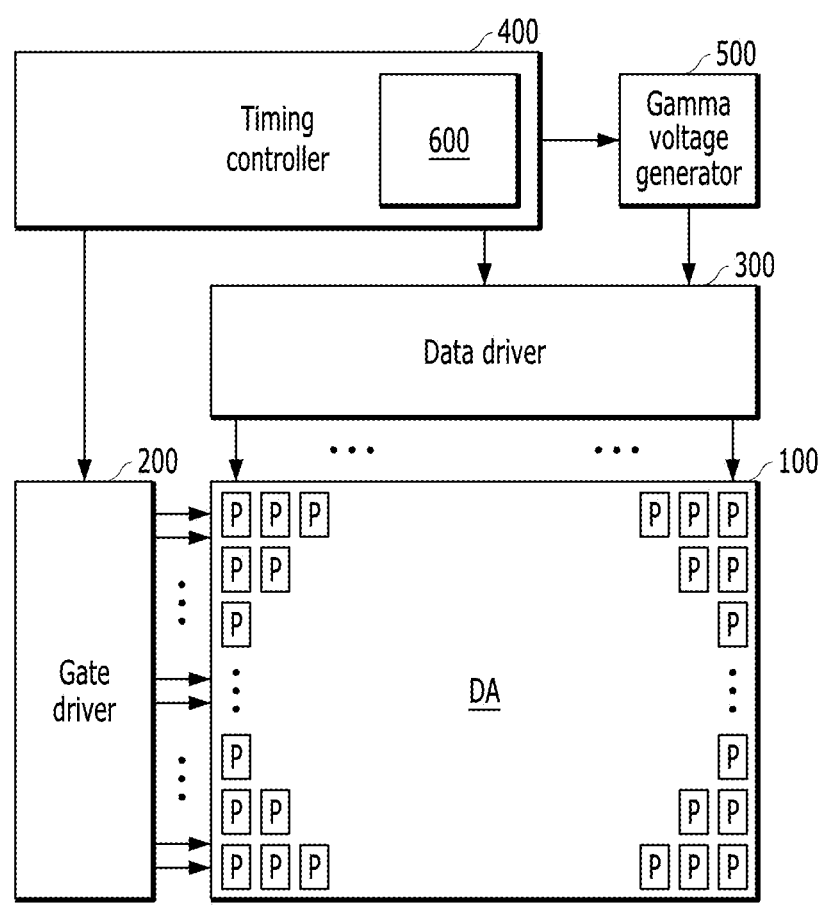
FIG. 1 is a block diagram schematically showing a display device according to various embodiments.
Figure 2:
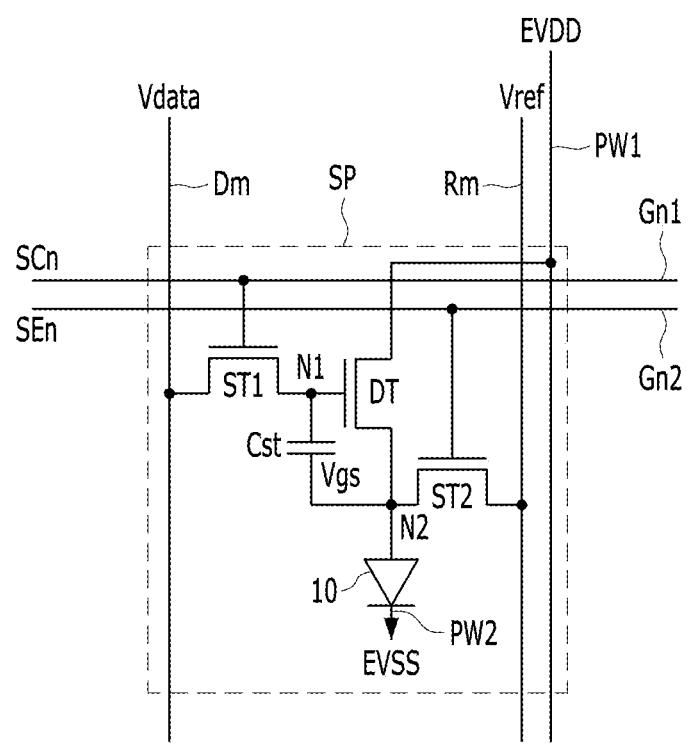
FIG. 2 is an equivalent circuit diagram showing a pixel configuration of the display device according to various embodiments.
Figure 3:
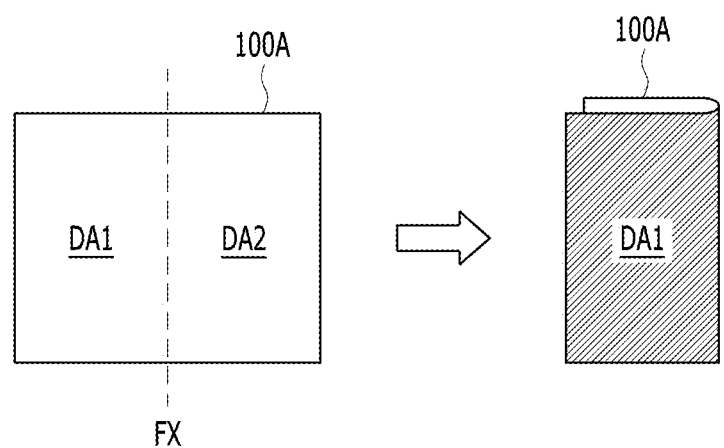
FIG. 3 is a diagram showing a folding state of a display device according to various embodiments.
Figure 4:
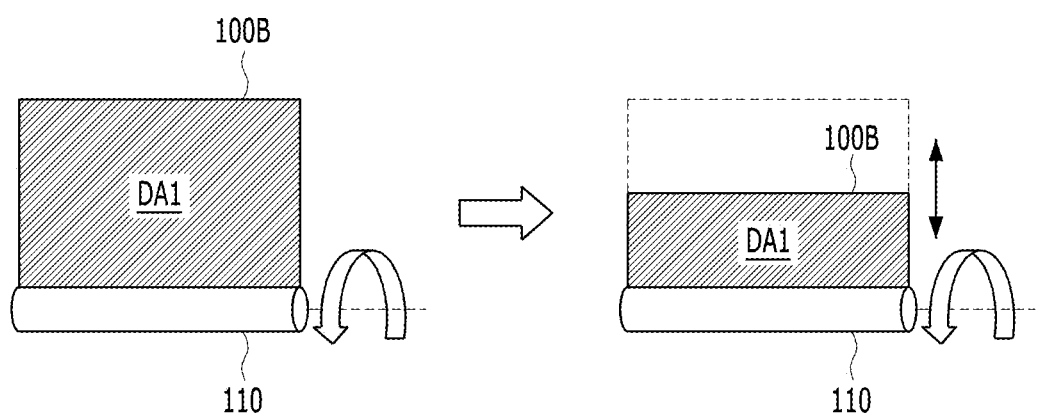
FIG. 4 is a diagram showing a rolled state of a display device according to various embodiments.

FIG. 1 is a block diagram schematically showing a display device according to various embodiments, FIG. 2 is an equivalent circuit diagram showing a pixel configuration according to various embodiments, FIG. 3 is a diagram showing a folding state of a foldable panel according to various embodiments, and FIG. 4 is a diagram showing a rolled state of a rollable panel according to various embodiments.

Referring to FIGS. 1 and 2, the display device may include a panel 100, a gate driver 200, a data driver 300, a timing controller 400, and a gamma voltage generator 500. In FIG. 1, the gate driver 200 and the data driver 300 may be referred to as a panel driver for driving the panel 100. The gate driver 200, the data driver 300, the timing controller 400, and the gamma voltage generator 500 may be collectively referred to as a driver. The timing controller 400 may include an image processor 600. The image processor 600 may be separated from the timing controller 400 and connected to the input terminal of the timing controller 400.

The panel 100 may have a variable shape such as a foldable, rollable or stretchable panel and thus the shape of the panel 100 can be varied according to environments in which the display device is used by a user.

The panel 100 displays an image through a display area DA composed of a pixel array. The pixel array may include red, green and blue pixels P and further include white pixels P. The panel 100 may include a touch sensor included therein or attached thereto, which is superposed on the display area DA and recognizes user's touch.

Each pixel P includes an emission element and a pixel circuit for independently driving the emission element. As the emission element, an organic light-emitting diode, a quantum-dot light-emitting diode or an inorganic light-emitting diode may be used. The pixel circuit includes a plurality of TFTs including at least a driving TFT for driving the emission element and a switching TFT for supplying a data signal to the driving TFT, and a storage capacitor that stores a driving voltage Vgs corresponding to a data signal supplied through the switching TFT and supplies the driving voltage Vgs to the driving TFT. In addition, the pixel circuit may further include a plurality of TFTs for initializing three elements (a gate, a source and a drain) of the driving TFT, connecting the driving TFT in a diode structure for threshold voltage compensation, or controlling an emission time of the emission element. Various configurations such as 3T1C (3 TFTs and 1 capacitor) and 7T1C (7 TFTs and 1 capacitor) are applicable as a configuration of the pixel circuit.

For example, as shown in FIG. 2, each pixel P includes a pixel circuit including at least an emission element 10 connected between a power line through which a high driving voltage (first driving voltage EVDD) is supplied and a common electrode through which a low driving voltage (second driving voltage EVSS) is supplied, and first and second switching TFTs ST1 and ST2, a driving TFT DT and a storage capacitor Cst for independently driving the emission element 10.

The emission element 10 may include an anode connected to a source node N2 of the driving TFT DT, a cathode connected to an EVSS line PW2, and an organic emission layer formed between the anode and the cathode. The anode is independent for each subpixel but the cathode may be a common electrode shared by subpixels. The emission element 10 generates light with brightness in proportion to a driving current supplied from the driving TFT DT in such a manner that electrons from the cathode are injected into the organic emission layer and holes from the anode are injected into the organic emission layer when the driving current is supplied from the driving TFT DT and electrons and holes are recombined in the organic emission layer to fluoresce or phosphoresce.

The first switching TFT ST1 is driven by a scan pulse signal SCn supplied from the gate driver 200 to a gate line Gn1 and provides a data voltage Vdata supplied from the data driver 300 to a data line Dm to a gate node N1 of the driving TFT DT.

The second switching TFT ST2 is driven by a sense pulse signal SEn supplied from the gate driver 200 to another gate line Gn2 and provides a reference voltage Vref supplied from the data driver 300 to a reference line Rm to the source node N2 of the driving TFT DT. In a sensing mode, the second switching TFT ST2 can provide a current in which characteristics of the driving TFT DT or characteristics of the emission element 10 are reflected to the reference line Rm.

The storage capacitor Cst connected between the gate node N1 and the source node N2 of the driving TFT DT charges a difference voltage between the data voltage Vdata and the reference voltage Vref respectively supplied to the gate node N1 and the source node N2 through the first and second switching TFTs ST1 and ST2 as a driving voltage Vgs of the driving TFT DT and holds the charged driving voltage Vgs for an emission period in which the first and second switching TFTs ST1 and ST2 are turned off.

The driving TFT DT controls a current supplied through an EVDD line PW1 in response to the driving voltage Vgs supplied from the storage capacitor Cst to provide a driving current determined by the driving voltage Vgs to the emission element 10, causing the emission element 10 to emit light.

The gate driver 200 is controlled by a plurality of gate control signals supplied from the timing controller 400 and individually drives gate lines of the panel 100. The gate driver 200 supplies a scan signal at a gate on voltage to a gate line in a driving period of the gate line and supplies a gate off voltage to the gate line in a non-driving period of the gate line.

The gamma voltage generator 500 generates a plurality of different reference gamma voltages having different voltage levels and provides the reference gamma voltages to the data driver 300. The gamma voltage generator 500 can adjust a reference gamma voltage level according to control of the timing controller 400.

The data driver 300 is controlled by a data control signal supplied from the timing controller 400, converts digital data received from the timing controller 400 into an analog data signal and provides the data signal to each data line of the panel 100. Here, the data driver 300 converts the digital data into the analog data signal using grayscale voltages obtained by subdividing the plurality of reference gamma voltages supplied from the gamma voltage generator 500. The data driver 300 can supply a reference voltage to the reference line.

In the sensing mode, the data driver 300 can supply a data voltage for sensing to data lines to drive each pixel according to control of the timing controller 400, senses a pixel current that represents electrical characteristics of a driven pixel as a voltage through the reference line Rm, converts the sensed voltage into digital sensing data and provides the digital sensing data to the timing controller 400.

The timing controller 400 controls the gate driver 200 and the data driver 300 using timing control signals supplied from an external system and timing setting information stored therein. The timing control signals may include a dot clock signal, a data enable signal, a vertical synchronization signal, a horizontal synchronization signal, and the like. The timing controller 400 generates a plurality of gate control signals for controlling operation timing of the gate driver 200 and supplies the plurality of gate control signals to the gate driver 200. The timing controller 400 generates a plurality of data control signals for controlling operation timing of the data driver 300 and supplies the plurality of data control signals to the data driver 300.

The image processor 600 of the timing controller 400 can perform various types of image processing for definition correction for source image data, compensation of deterioration of emission elements, and the like and reduce power consumption by analyzing image data and controlling image luminance.

The image processor 600 of the timing controller 400 can convert data (grayscale data) on which image processing has been performed into voltage data, apply a compensation value for a characteristic deviation of each pixel stored in a memory to the voltage data to compensate for the voltage data, and provide the compensated data to the data driver 300. To this end, the image processor 600 can control the gate driver 200 and the data driver 300 to drive the panel 100 in a sensing mode, sense electrical characteristics (a threshold voltage and mobility of a driving TFT, and a threshold value of an emission element) of each pixel of the panel 100 through the data driver 300, and update the compensation value of each pixel stored in the memory using a sensing result.

The image processor 600 can detect change in the shape of the panel 100 and a viewing environment/state of a user, and when the shape of the panel 100 is changed, divide the display area DA into a plurality of display areas and separately drive the display areas as a viewing area and a non-viewing area or control the display areas such that they display different images.

Referring to FIG. 3, when a foldable panel 100A is folded, the image processor 600 can detect a folding state of the panel 100A from an external sensor signal, divide the display area DA of the panel 100A into first and second display areas DA1 and DA2 on the basis of a folding axis FX and separately drive the first and second display areas DA1 and DA2. The image processor 600 can detect a viewing environment and state of a user from an external signal and separately drive the first and second display areas DA1 and DA2 as a viewing area and a non-viewing area of the user.

Referring to FIG. 4, when a rollable panel 100B is rolled, the image processor 600 can detect a rolled state by receiving rotation information from an external roller 110 and separately drive the display DA of the panel 100B as a first display area DA1 that is a viewing area on the roller 110 and a second display area that is a non-viewing area rolled into the roller 100. The size of the first display area DA1 that is the viewing area on the roller 110 can be varied according to the number of rotations and a rotation state of the roller 110.

The image processor 600 may supply a first display image to the viewing area and supply a second display image to the non-viewing area, and the second display image may be a black image or a specific image set by a user or a designer.

The image processor 600 can reduce a stress cumulative difference and delay or prevent generation of image sticking at the boundary (hereinafter, a boundary neighboring region) between the first and second display areas by performing modulation for delaying image sticking on data with respect to the boundary between the first and second display areas when the display panel is separately driven as the first and second display areas. This will be described in detail below using a foldable panel.

Figure 5:
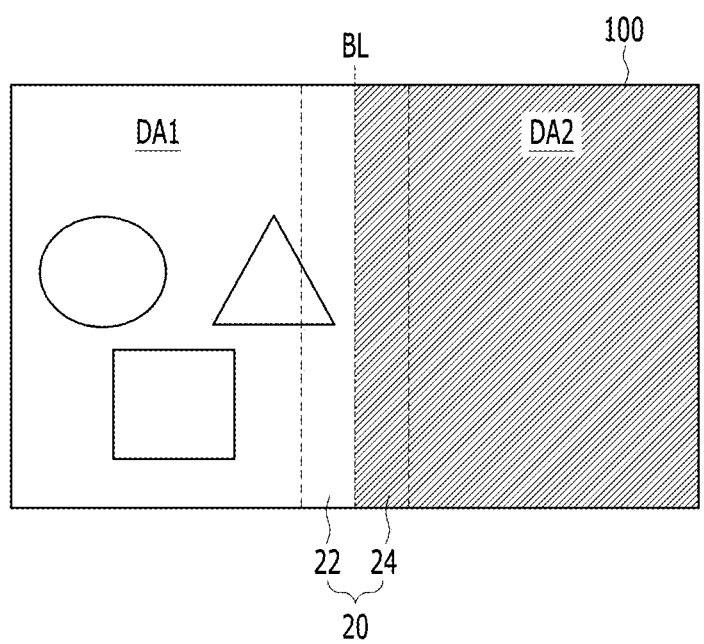
FIG. 5 is a diagram showing image processing of a timing controller performed on a region adjacent to a boundary.
Figure 5:
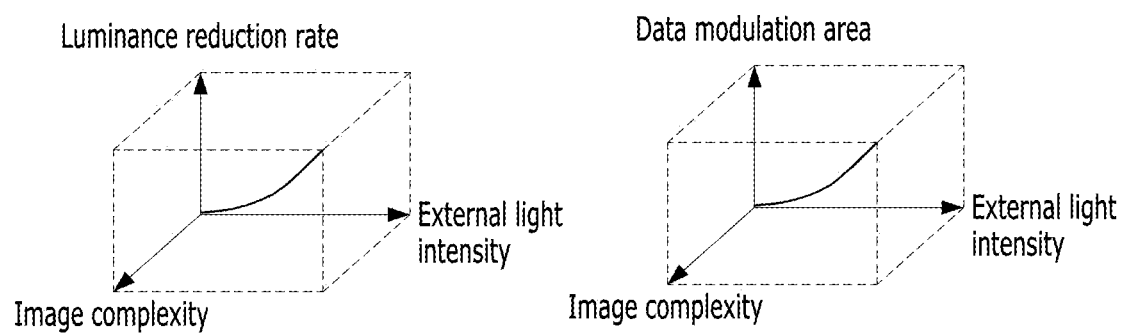

FIG. 5 is a diagram showing image processing of the timing controller performed on the region adjacent to the boundary according to various embodiments.

Referring to FIG. 5, the panel 100 can be divided into the first and second display areas DA1 and DA2 on the basis of a folding axis and driven by the driver including the image processor 600. An image viewed by a user may be displayed in the first display area DA1 and a black image may be displayed in the second display area DA2.

The first and second display areas DA1 and DA2 include a boundary line BL therebetween and a boundary neighboring region 20 adjacent to the boundary line BL on the left and right sides, and the boundary neighboring region 20 includes a first boundary neighboring region 22 included in the first display area DA1 and a second boundary neighboring region 24 included in the second display area DA2.

The image processor 600 can modulate data with respect to the boundary neighboring region 20 of the first and second display areas DA1 and DA2 to reduce a stress cumulative difference between the first and second display areas DA1 and DA2, particularly, a stress cumulative deviation and delay or prevent generation of image sticking in the boundary neighboring region 20.

The image processor 600 can modulate data using a method of decreasing the luminance of the boundary neighboring region 20. Since a luminance deviation relatively recognized by a user varies according to external illuminance and image complexity, the image processor 600 can control a luminance reduction rate and a data modulation area such that a user cannot recognize luminance variation in consideration of the brightness, colors and complexity of an image and external light intensity (illuminance). As shown in FIG. 5, a luminance reduction rate and a data modulation area (the area of the boundary neighboring region on which data modulation processing is performed) with respect to the boundary neighboring region 20 may be proportional to image complexity and the external light intensity. The luminance reduction rate and the data modulation area may increase as the external light intensity and image complexity increase.

Figure 6:
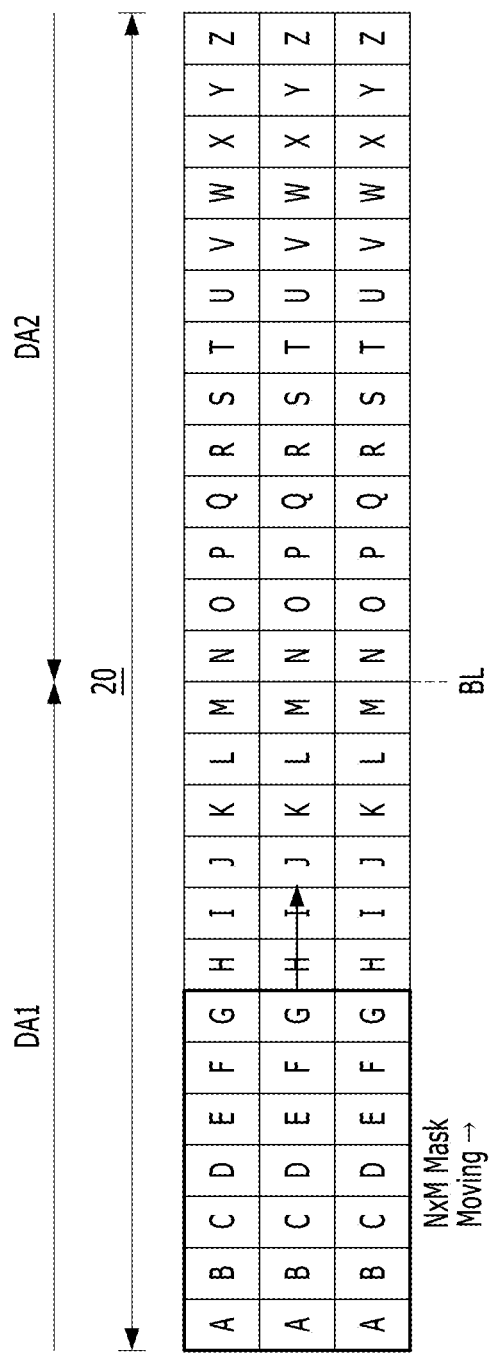
FIG. 6 is a diagram showing a mask applied to a data modulation method according to various embodiments.
Figure 7:
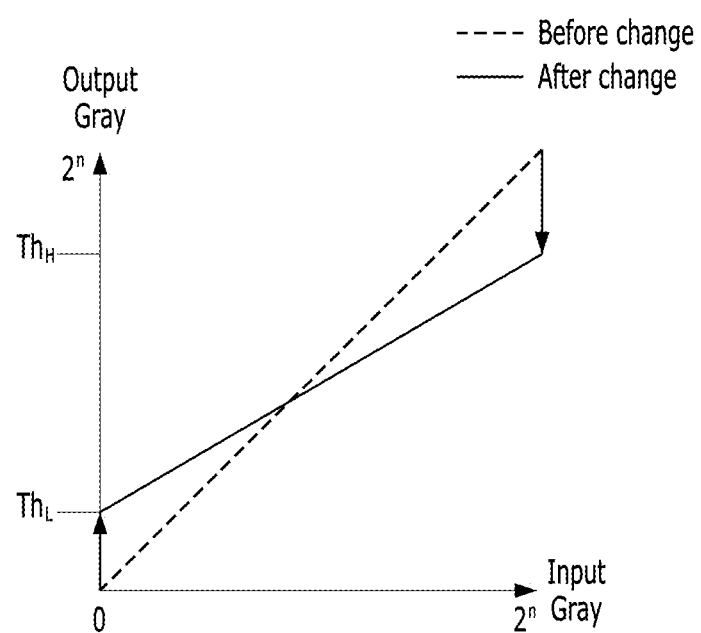
FIG. 7 is a graph showing a method of controlling the luminance of a data modulation region according to various embodiments.

FIG. 6 is a diagram showing a mask applied to a data modulation method according to various embodiments, and FIG. 7 is a graph showing a method of controlling the luminance of a data modulation region according to various embodiments.

Referring to FIGS. 6 and 7, the image processor 600 can use a method of reducing a dynamic range between the first and second display areas DA1 and DA2, that is, a method of reducing a difference between a minimum value and a maximum value in a mask applied to the boundary neighboring region 20, as a data modulation method for the boundary neighboring region 20 included in the first and second display areas DA1 and DA2.

The image processor 600 can modulate data with respect to the boundary neighboring region 20 included in the first and second display areas DA1 and DA2 in units of a mask having a size of N*M (N and M being integers equal to or greater than 2) shown in FIG. 6 using functions represented by the following mathematical expressions 1 and 2.

As represented by the following mathematical expression 1, output data Output for current input data $Input_{current}$ is determined by multiplying the input data $Input_{current}$ by a ratio of a difference between a maximum reference value $Th_H$ and a minimum reference value $Th_L$ to a maximum grayscale value of 255 and adding the minimum reference value $Th_L$ to the multiplication result.

$$Output = \left(\frac{Th_H - Th_L}{255}\right) * Input_{current} + Th_L \quad \text{Mathematical Expression 1}$$

In the mathematical expression 1, the maximum reference value $Th_H$ and the minimum reference value $Th_L$ can be determined by applying an average brightness of corresponding data, external light intensity, image complexity and recognition parameters in units of N*M pixels corresponding to the mask having a size of N*M (N and M being integers greater than 2) shown in FIG. 6, as represented by the following mathematical expression 2. The maximum reference value $Th_H$ and the minimum reference value $Th_L$ can be determined in units of mask size.

Mathematical Expression 2

$$Th_H = \underbrace{\frac{APL + Input_{Max}}{2}}_{\text{Average brightness}} * \underbrace{(1 - Para_H)}_{\text{Recognition Parameter}} *$$

$$\underbrace{\left(1 - \frac{Lumi_{Current}}{Lumi_{Max}}\right)}_{\text{External light intensity}} * \underbrace{\left(\frac{\text{Edge count} + (N + M)}{N * M + (N + M)}\right)}_{\text{Image complexity}}$$

$$Th_L = \frac{APL + Input_{Max}}{2} * Para_L * \left(1 - \frac{Lumi_{Current}}{Lumi_{Max}}\right) *$$

$$\left(\frac{\text{Edge count} + (N + M)}{N * M + (N + M)}\right)$$

$$Input_{Max} = \text{Max}(Input_{ij})$$

$$[-N/2 \le i \le N/2, -M/2 \le j \le M/2]$$

$$APL = \text{Mean}(Input_{ij})$$

$$[-N/2 \le i \le N/2, -M/2 \le j \le M/2]$$

$$Para_H = 0.25 \sim 0.4$$

$$Para_L = 0.05 \sim 0.1$$

$$N, M = \text{Mask size}$$

($Para_H$, $Para_L$, $N$ and $M$ are recognition evaluation parameters)

In mathematical expression 2, high and low recognition parameters $Para_H$ and $Para_L$ are set values according to panel characteristics or image characteristics but can be controlled according to a panel folding angle, as will be described later. The average brightness term is determined as an average value of an average luminance level and a maximum value $Input_{max}$ of image data in the mask. The term of the external light intensity is determined as a value obtained by subtracting a ratio of current luminance $Lumi_{current}$ to maximum luminance $Lumi_{max}$ from 1. The image complexity term is determined using a percentage of edge count in the mask. The maximum reference value $Th_H$ and the minimum reference value $Th_L$ are determined using all of the average brightness, the external light intensity and image complexity. A value obtained by subtracting the high recognition parameter $Para_H$ from 1 is additionally applied to the maximum reference value $Th_H$. The low recognition parameter $Para_L$ is additionally applied to the minimum reference value $Th_L$.

As described above, the image processor 600 can modulate data with respect to the boundary neighboring region 20 included in the first and second display areas DA1 and DA2 in units of a mask using the average brightness and image complexity in a mask and the external light intensity, and thus the luminance and contrast of the boundary neighboring region 20 can be reduced, and shown in FIG. 7. As a result, a cumulative stress deviation in the boundary neighboring region 20 can be reduced and generation of image sticking can be prevented.

Figure 8:
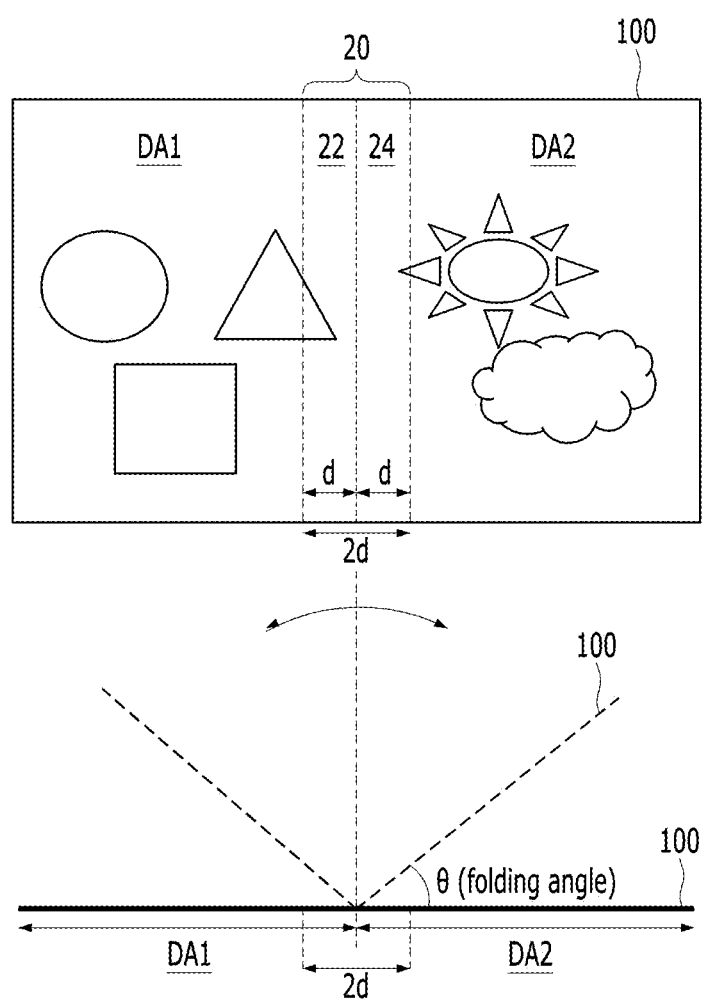
FIG. 8 is a diagram showing a folding angle variable state according to various embodiments.
Figure 9:
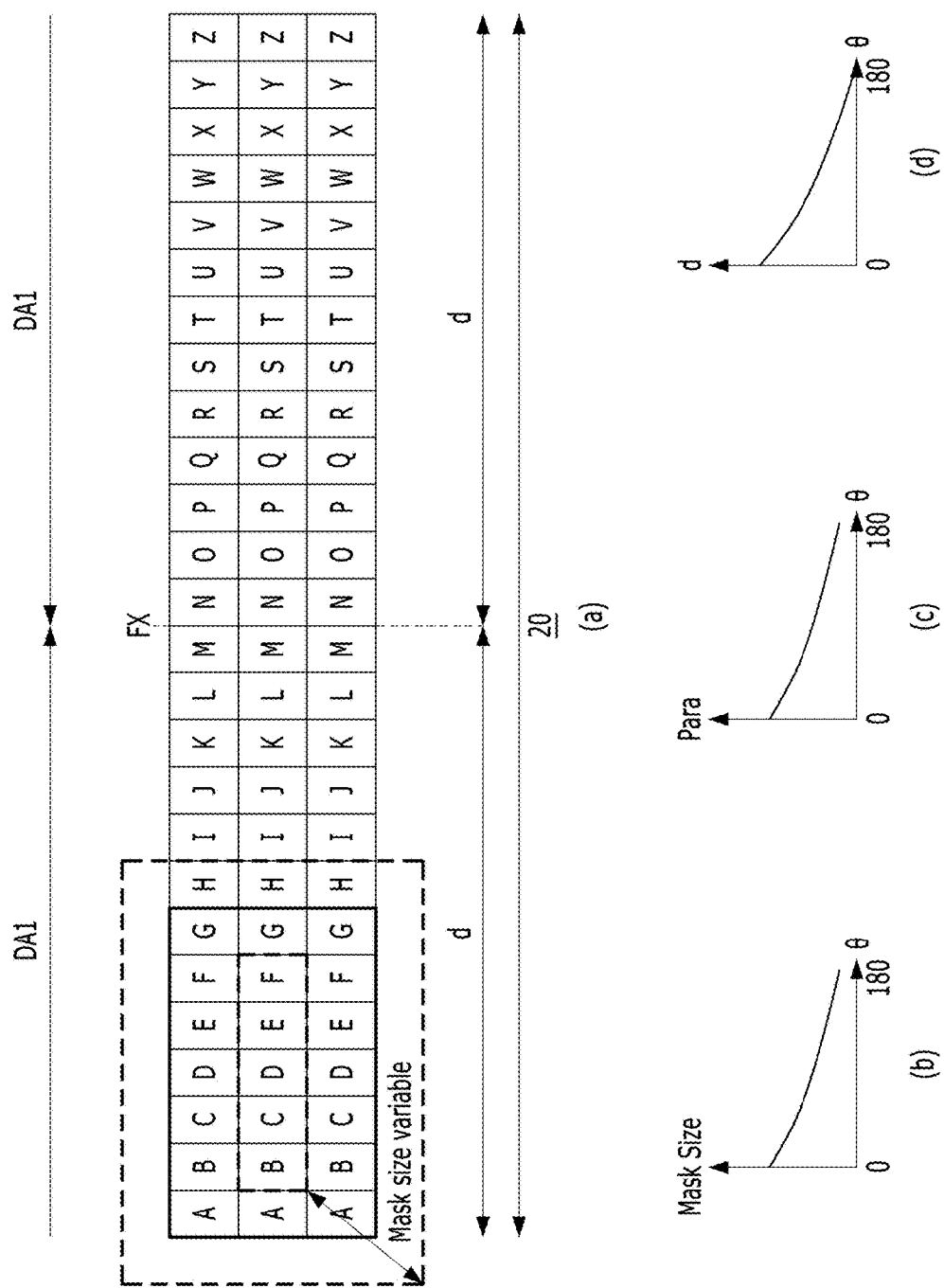
FIG. 9 is a diagram showing a relationship between various variables applied to data modulation with respect to a region adjacent to a boundary and a folding angle according to various embodiments.

FIG. 8 is a diagram showing a folding angle variable state according to various embodiments, and FIG. 9 is a diagram showing a relationship between various variables applied to data modulation for a boundary neighboring region and a folding angle according to various embodiments.

Referring to FIG. 8, when the foldable panel 100 is folded, different first and second images may be respectively displayed in the first and second display areas DA1 and DA2 according to a user state and product usage.

The image processor 600 can prevent stress cumulative deviation due to a difference between the first and second images displayed in the first and second display areas DA1 and DA2 and image sticking caused thereby through the aforementioned data modulation performed at the boundary neighboring region 20 between the first and second display areas DA1 and DA2.

Particularly, the image processor can control at least one of a pixel distance 2d of the boundary neighboring region 20 to which data modulation for image sticking delay is applied, recognition parameters $Para_H$ and $Para_L$ used for data modulation, and a mask size in response to a folding angle θ in a folding state of the panel 100.

The image processor 600 can adjust a data modulation processing area in response to the folding angle θ by controlling the pixel distance 2d of the boundary neighboring region 20 to which data modulation is applied in response to the folding angle θ in a folding state of the panel 100. The horizontal pixel distance 2d of the boundary neighboring region 20 refers to the sum of a pixel distance d of the first boundary neighboring region 22 included in the first display area DA1 and a pixel distance d of the second boundary neighboring region 24 included in the second display area DA2. The pixel distance 2d of the boundary neighboring region 20 to which data modulation is applied, that is, a distance variable d, can increase as the folding angle θ decreases and decrease as the folding angle θ increases, as shown in (d) of FIG. 9. It is desirable that the pixel distance d of each of the first and second boundary neighboring regions 22 and 24 to which data modulation is applied be varied within 5% of the corresponding display area in consideration of a recognition level of a user, and the distance of 5% may vary according to products.

The image processor 600 can control the size of a mask used for data modulation according to the folding angle θ of the panel 100, as shown in (a) and (b) of FIG. 9. The mask size can increase as the folding angle θ decreases and decrease as the folding angle θ increases.

The image processor 600 can control the recognition parameters $Para_H$ and $Para_L$ used for data modulation in response to the folding angle θ, as shown in (c) of FIG. 9. The recognition parameters $Para_H$ and $Para_L$ can increase as the folding angle θ decreases and decrease as the folding angle θ increases.

Furthermore, the image processor 600 can prevent image sticking using a method of appropriately mixing images displayed in the first boundary neighboring region 22 and the second boundary neighboring region 24 of the boundary neighboring region 20 according to blurring using an average filter that applies a mask having a size of N*M to the boundary neighboring region 20 in the first and second display areas DA1 and DA2. The image processor 600 can control the pixel distance 2d of the boundary neighboring region 20 to which blurring is applied and a mask size for blurring in response to the folding angle θ as shown in FIG. 9.

When the panel 100 is folded, a bent region is not a main viewing area and thus the image processor 600 can prevent image sticking using a method of reducing only luminance while maintaining morphological information of left and right images without mixing the left and right images. The image processor 600 can control the pixel distance 2d of the boundary neighboring region 20 to which luminance reduction processing is applied in response to the folding angle θ as shown in FIG. 9.

Figure 10:
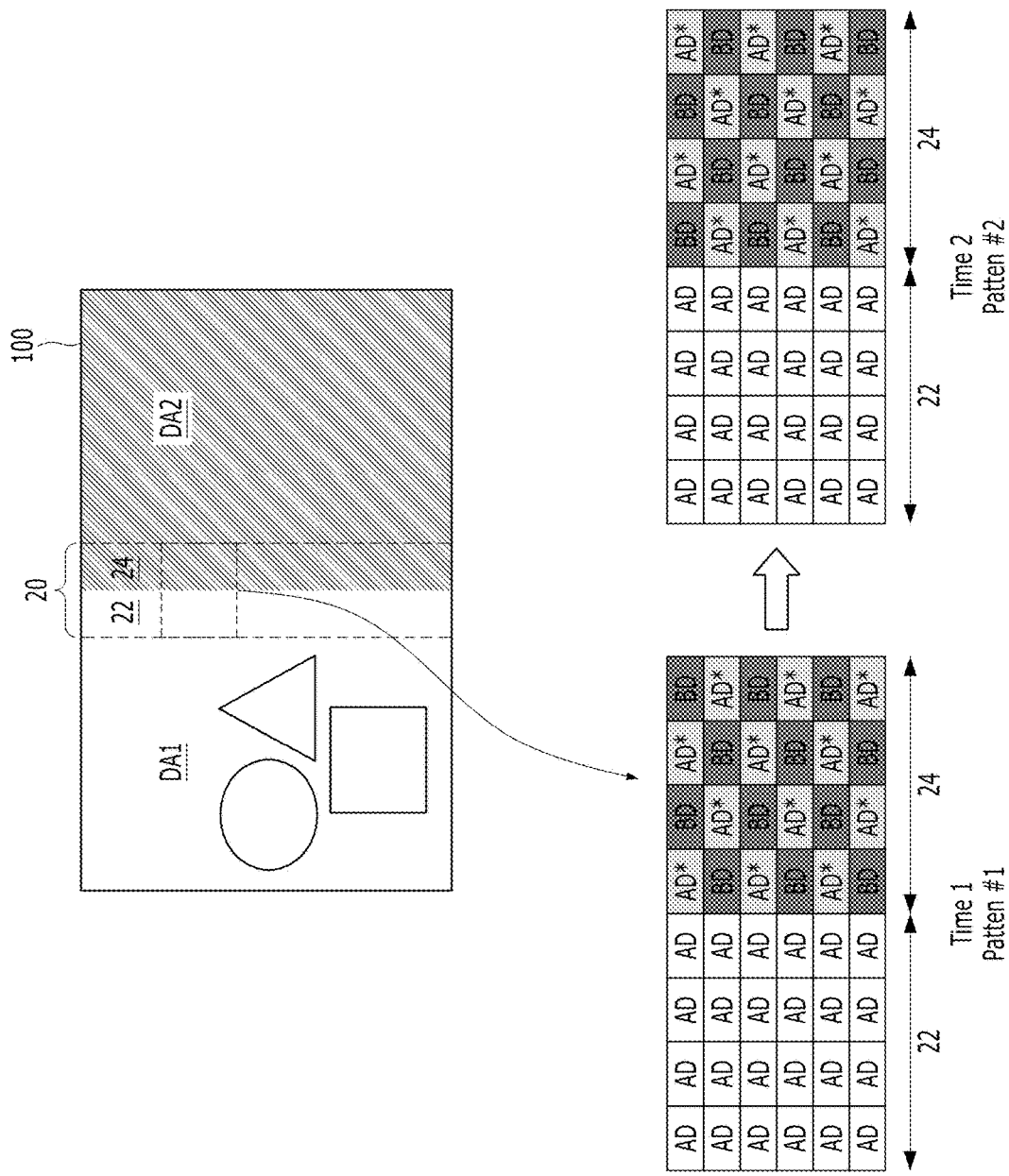
FIG. 10 is a diagram showing a data modulation method according to various embodiments.
Figure 11:
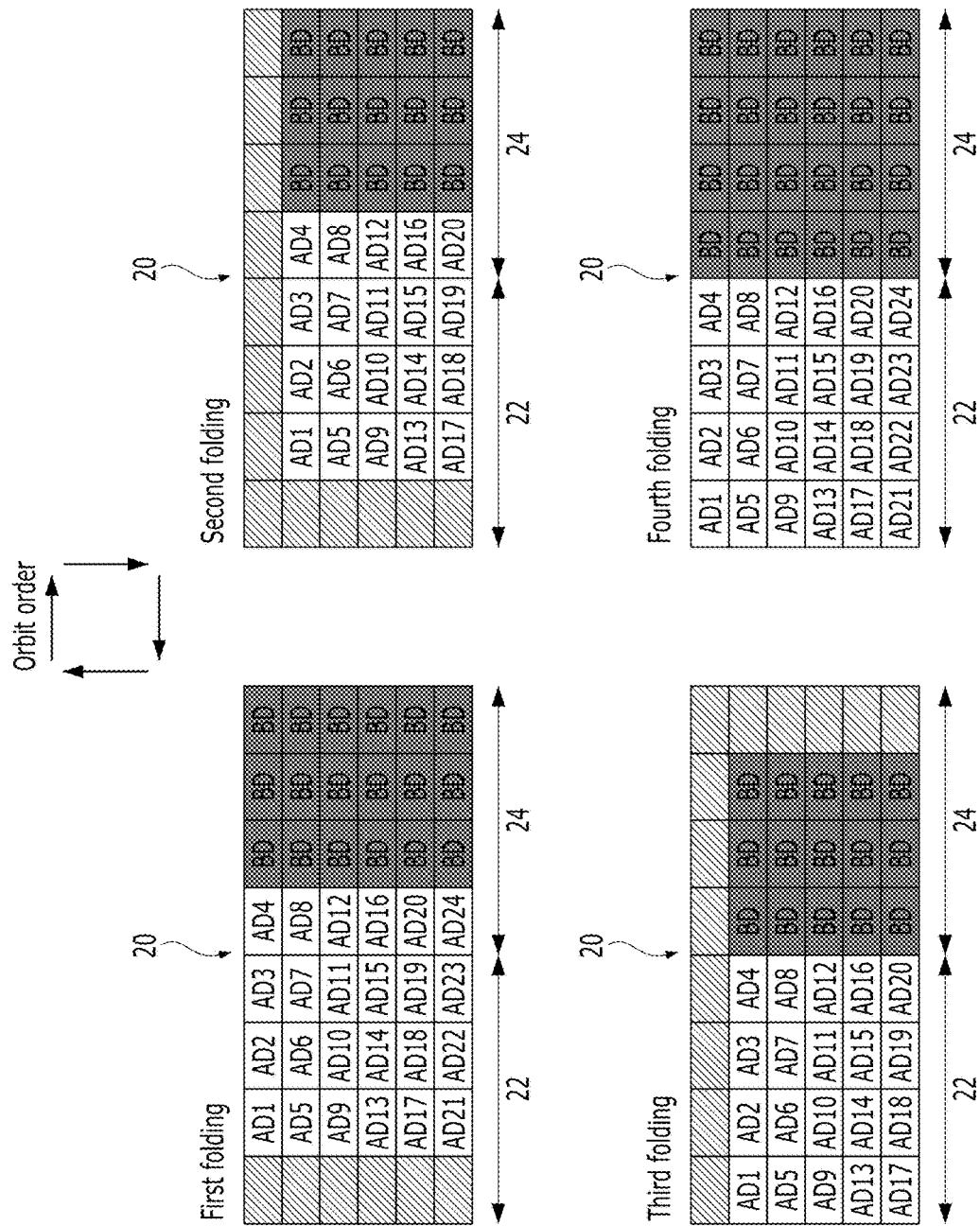
FIG. 11 is a diagram showing a data modulation method according to various embodiments.

FIGS. 10 and 11 are diagrams showing various data processing methods for a boundary neighboring region according to various embodiments.

Referring to FIG. 10, the image processor 600 can display a first image AD in the first display area DA1 that is a viewing area of the foldable panel 100 and display a black image BD in the second display area DA2 that is a non-viewing area. The image processor 600 can extend the image displayed in the first boundary neighboring region 22 to the second boundary neighboring region 24 in such a manner that the luminance of the image decreases using a method of modulating data of the boundary neighboring region 20. For example, the image processor 600 can generate modulated data AD* obtained by reducing the luminance of image data AD of the first boundary neighboring region 22, display mixture patterns #1 and #2 obtained by alternately mixing the modulated data AD* and the black data BD in the second boundary neighboring region 24, and change pixel positions of the mixture patterns #1 and #2 and display the same with the lapse of time to delay image sticking in the boundary neighboring region 20.

Referring to FIG. 11, the image processor 600 can delay image sticking in the boundary neighboring region 20 through orbit processing of shifting an image AD displayed in the first boundary neighboring region 22 and a black image BD displayed in the second boundary neighboring region 24 pixel by pixel according to the number of times of folding of the foldable panel 100.

Figure 12:
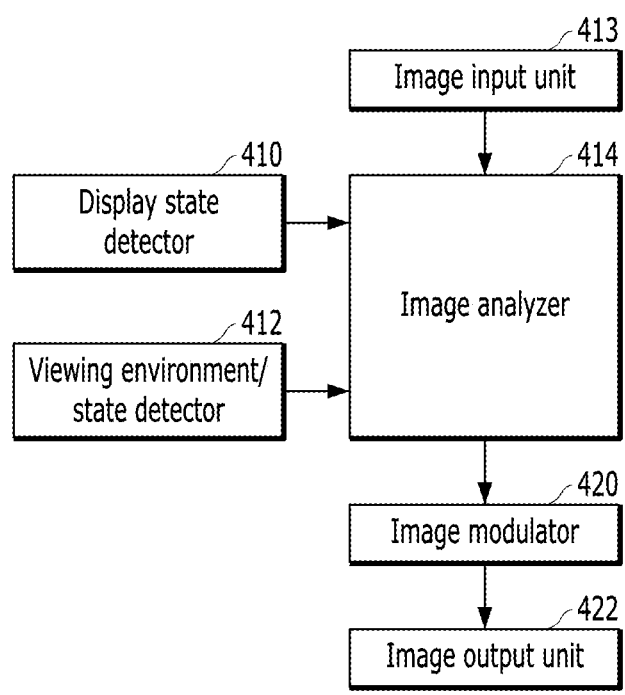
FIG. 12 is a diagram showing an image processor of the display device according to various embodiments.
Figure 13:
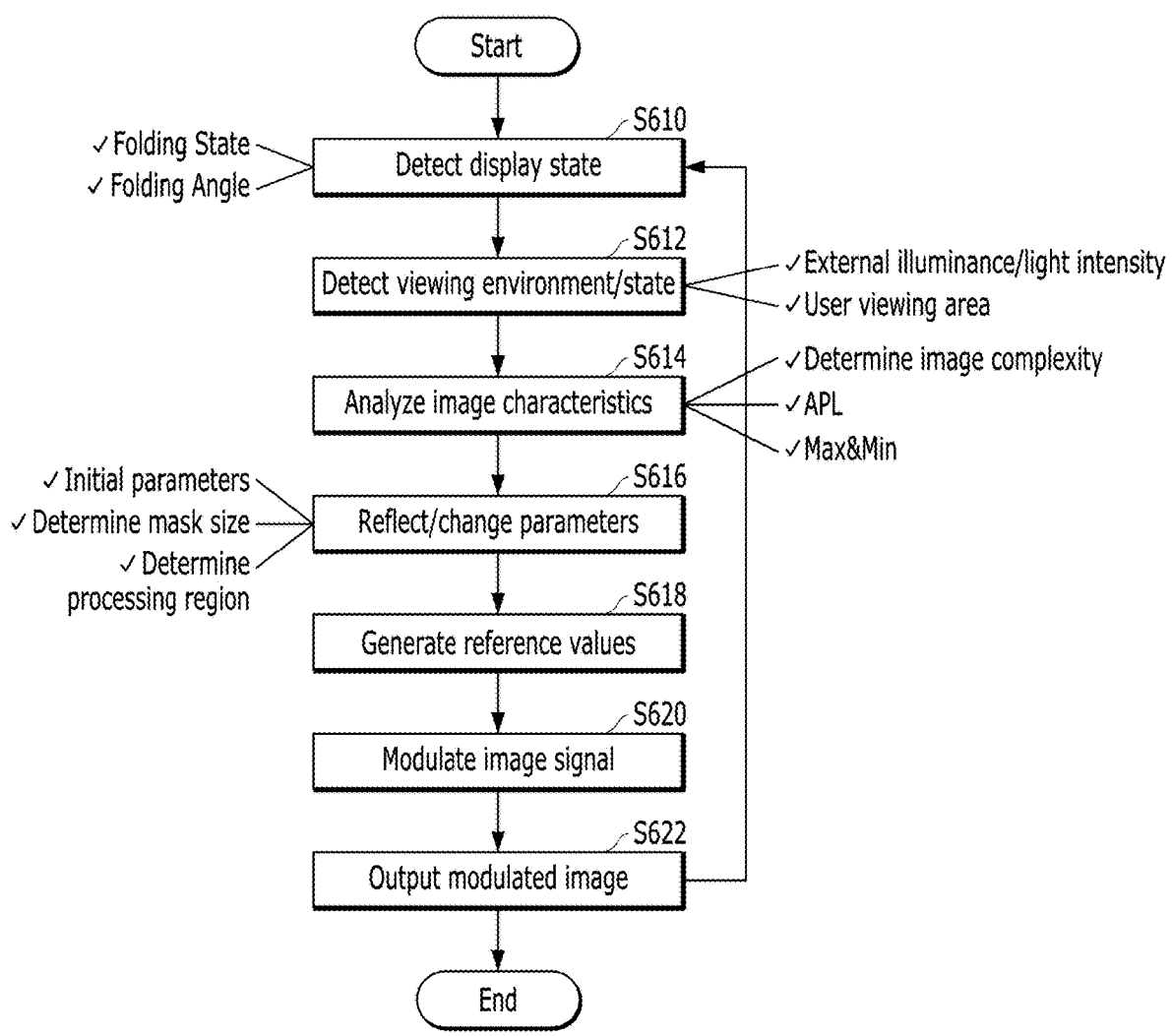
FIG. 13 is a diagram showing an image processing method of the display device according to various embodiments.

FIG. 12 is a block diagram showing a configuration of the image processor of the display device according to various embodiments and FIG. 13 is a flowchart showing an image processing method of the display device according to various embodiments.

Referring to FIG. 12, the image processor 600 according to various embodiments includes a display state detector 410, a viewing environment/state detector 412, an image input unit 413, an image analyzer 414, an image modulator 420, and an image output unit 422.

Referring to FIGS. 12 and 13, the display state detector 410 can detect a shape change state of the panel 100 having a variable shape, such as a foldable or rollable panel, through an external sensor or the like (S610).

For example, in the case of a foldable display device, the display state detector 410 can detect a folding state of the panel 100 by detecting contact at the edge of the panel through a sensor provided in the display device or detect a folding state and a folding angle through a sensor of a folding unit. The display state detector 410 can determine a state of the display device through a gyro sensor and a distance sensor.

In the case of a rollable display device, the display state detector 410 can determine whether the panel 100 is rolled, a degree of rolling, and a rolled state by receiving the number of rotations and state of a rolling motor on the basis of the entire panel area.

The viewing environment/state detector 412 can detect a viewing environment and a viewing state of a user including external illuminance/light intensity and a viewing area of the user through various sensors including an illumination sensor, a camera, and the like provided in the display device (S612).

The image analyzer 414 can receive an input image through the image input unit 413, detect a shape change state of the panel 100 and a viewing state of the user using display state information received from the display state detector 610 and viewing environment/state information received from the viewing environment/state detector 612, and divide the display area DA into the first and second display areas DA1 and DA2. The image analyzer 414 can set the first and second display areas DA1 and DA2 to a viewing area and a non-viewing area of the user or to areas in which first and second images are respectively displayed. The image analyzer 414 can determine the boundary neighboring region 20 in which data modulation is required to delay image sticking in the first and second display areas DA1 and DA2 using the display state information and the viewing environment/state information and analyze characteristics of an image with respect to the boundary neighboring region 20 (S614). The image analyzer 414 can determine Average Picture Level (APL), a maximum value, a minimum value, image complexity, and the like in units of a mask by applying the mask to the image with respect to the boundary neighboring region 20, as described above. The image analyzer 414 can determine image complexity by counting edge intensity or edge count in the mask.

The image analyzer 414 can reflect or change at least one of the area (pixel distance) of the boundary neighboring region 20 that is a data modulation processing area, the size of an image analysis mask, and recognition parameters in response to a folding angle and external light intensity (S616).

The image analyzer 414 can generate a maximum reference value $Th_H$ and a minimum reference value $Th_L$ with respect to the boundary neighboring region 20 as represented by the aforementioned mathematical expression 2 using an image analysis result and parameters (S618).

The image modulator 420 can modulate input data for the boundary neighboring region 20 into output data as represented by mathematical expression 1 using the maximum reference value $Th_H$ and the minimum reference value $Th_L$ received from the image analyzer 414 (S620) and output the modulated data through the image output unit 422 (S622). The image output unit 422 outputs the modulated data to the boundary neighboring region 20 and outputs corresponding image data to the remaining area of the first and second display areas DA1 and DA2.

As described above, the display device according to various embodiments can reduce a stress cumulative deviation and delay or prevent image sticking in a boundary neighboring region between the first and second display areas separately driven according to a display panel shape and use environment by modulating image data with respect to the boundary neighboring region in consideration of the luminance, colors and complexity of an image, and illuminance.

The display device according to various embodiments can reduce a stress cumulative deviation and delay or prevent image sticking in a boundary neighboring region between the first and second display areas by controlling at least one of a data modulation processing area, a mask size and recognition parameters with respect to the boundary neighboring region in response to a folding angle.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a panel displaying an image through a display area, the panel including a plurality of pixels and having a variable shape;
a panel driver for driving the panel; and
an image processor for dividing the display area into a first display area and a second display area when the shape of the panel is changed, determining a boundary neighboring region including a first boundary neighboring region adjacent to a boundary line between the first and second display areas in the first display area and a second boundary neighboring region adjacent to the boundary line in the second display area, and modulating data corresponding to the boundary neighboring region based on a result of analysis of an image corresponding to the boundary neighboring region,
wherein the image processor modulates the data corresponding to the boundary neighboring region such that luminance and contrast of the boundary neighboring region decrease based on average brightness and image complexity in the boundary neighboring region is included in the image analysis result with respect to the boundary neighboring region and external light intensity.

2. The display device of claim 1, wherein the image processor determines at least one of the area for the boundary neighboring region on which data modulation is performed or a decrement amount for luminance and contrast based on the external light intensity.

3. The display device of claim 1, wherein the image processor applies a mask for analyzing the image corresponding to the boundary neighboring region, determines a maximum reference value and a minimum reference value for determining the contrast based on the average brightness of the boundary neighboring region, the image complexity according to image edge count of the boundary neighboring region, the external light intensity, and recognition parameters in units of the mask, and modulates image data of the boundary neighboring region using a ratio of a difference between the determined maximum reference value and the determined minimum reference value to a maximum value of image data determined by a bit number, and the determined minimum reference value.

4. The display device of claim 3, wherein the image processor detects a folding angle of the panel through a sensor and determines at least one of a pixel distance for the boundary neighboring region on which data modulation is performed, a size for the mask for image analysis, or the recognition parameters based on the folding angle of the panel.

5. The display device of claim 4, wherein as the folding angle decreases, the pixel distance for the boundary neighboring region, the size for the mask, and the recognition parameters increase.

6. The display device of claim 1, wherein the image processor detects change in the shape of the panel through a display state detector, detects the external light intensity and a viewing environment and viewing state of a user through a viewing environment/state detector, analyzes image characteristics in the boundary neighboring region according to the detected panel shape change and the viewing environment and viewing state of the user, and determines at least one of the area for the boundary neighboring region or a decrement amount for the luminance and contrast.

7. The display device of claim 1, wherein the image processor determines the first display area as a viewing area, determines the second display area as a non-viewing area based on the detected panel shape and a viewing state of a user, provides a corresponding image to the first display area, and provides a black image to the second display area.

8. The display device of claim 1, wherein the image processor determines both the first display area and the second display area as a viewing area on the basis of the detected panel shape and viewing state of a user, provides a first image to the first display area, and provides a second image to the second display area.

9. The display device of claim 1, wherein the panel is a foldable panel,
wherein the image processor detects a folding state and a folding angle of the foldable panel through an external sensor.

10. The display device of claim 9, wherein the panel is a rollable panel,
wherein the image processor receives a number of rotations and rotating state information with respect to the rollable panel from a roller and divides the display area into the first display area corresponding to a viewing area and the second display area corresponding to a non-viewing area.

11. An image processing method of a display device, comprising:
detecting change in a shape of a panel displaying an image through a display area, the panel including a plurality of pixels; and
dividing the display area into a first display area and a second display area when the shape of the panel is changed, determining a boundary neighboring region including a first boundary neighboring region adjacent to a boundary line between the first and second display areas in the first display area and a second boundary neighboring region adjacent to the boundary line in the second display area, and modulating data corresponding to the boundary neighboring region using a result of analysis of an image corresponding to the boundary neighboring region,
further comprising detecting a viewing environment of a user including external light intensity, and a viewing state of the user, wherein the modulating of the data includes:
modulating the data corresponding to the boundary neighboring region such that luminance and contrast of the boundary neighboring region decrease based on average brightness and image complexity of the boundary neighboring region is included in an image analysis result with respect to the boundary neighboring region and external light intensity.

12. The image processing method of claim 11, wherein the modulating of the data includes:
controlling at least one of the area for the boundary neighboring region on which data modulation is performed or a decrement amount for luminance and contrast according to the external light intensity.

13. The image processing method of claim 12, wherein the modulating of the data includes:
applying a mask for image analysis to the image corresponding to the boundary neighboring region and determining a maximum reference value and a minimum reference value for determining the contrast by applying the average brightness of the boundary neighboring region, the image complexity according to image edge count of the boundary neighboring region, the external light intensity, and recognition parameters in units of the mask; and
modulating image data of the boundary neighboring region using a ratio of a difference between the determined maximum reference value and the determined minimum reference value to a maximum value of image data determined by a bit number, and the determined minimum reference value.

* * * * *